(12) United States Patent
De Schacht et al.

(10) Patent No.: US 8,898,223 B2
(45) Date of Patent: Nov. 25, 2014

(54) SYSTEM FOR HIGH RELIABILITY AND HIGH PERFORMANCE APPLICATION MESSAGE DELIVERY

(75) Inventors: Paul De Schacht, Montauroux (FR); Thomas Pare, Grasse (FR); Matthieu Pascal, Mandelieu (FR)

(73) Assignee: Amadeus S.A.S., Sophia Antipolis (FR)

( * ) Notice: Subject to any disclaimer, the term of this patent is extended or adjusted under 35 U.S.C. 154(b) by 164 days.

(21) Appl. No.: 13/418,819

(22) Filed: Mar. 13, 2012

(65) Prior Publication Data

US 2013/0173691 A1    Jul. 4, 2013

(30) Foreign Application Priority Data

Dec. 29, 2011    (EP) .................................... 11306803

(51) Int. Cl.
*G06F 15/16*    (2006.01)

(52) U.S. Cl.
USPC .......................................... 709/203; 707/758

(58) Field of Classification Search
None
See application file for complete search history.

(56) References Cited

U.S. PATENT DOCUMENTS

| | | | | |
|---|---|---|---|---|
| 2003/0167326 A1* | 9/2003 | de Bonet | ....................... | 709/224 |
| 2007/0061383 A1 | 3/2007 | Ozawa et al. | | |
| 2010/0017716 A1* | 1/2010 | Weda et al. | ................... | 715/719 |
| 2011/0295813 A1* | 12/2011 | Pickard et al. | ................ | 707/672 |
| 2013/0073532 A1* | 3/2013 | Bachar et al. | ................ | 707/704 |

FOREIGN PATENT DOCUMENTS

| | | |
|---|---|---|
| EP | 1906628 A1 | 4/2008 |
| WO | 02062993 A1 | 8/2002 |

OTHER PUBLICATIONS

European Patent Office, International Search Report and Written Opinion issued in International application No. PCT/EP2012/076937 dated Feb. 27, 2013.

* cited by examiner

*Primary Examiner* — Moustafa M Meky
*Assistant Examiner* — Clayton R Williams
(74) *Attorney, Agent, or Firm* — Wood, Herron & Evans LLP

(57) ABSTRACT

A computer-implemented method and system of providing application message delivery, includes the following steps performed with at least one data processor:
at a plurality of log servers coupled to at least an application server: receiving asynchronously from the server, application messages containing application information; and control messages at a predetermined interval;
at each log server: storing received application messages in a current application data file and received control messages in a control file; and upon receiving an open-close control message, closing the current application data file, storing the closed application data file and creating a new current application data file;
comparing the control files of the plurality of log servers for a given interval; and
based on this comparison, determining from a plurality of application data files from each log server, an application data file as a best-candidate for a given interval and forwarding the best-candidate file for post-processing.

21 Claims, 9 Drawing Sheets

SYSTEM FOR HIGH RELIABILITY AND HIGH PERFORMANCE APPLICATION MESSAGE DELIVERY

TECHNICAL FIELD

The present invention relates to the field of delivery of high volume of electronic messages. A particularly advantageous but not limitative application relates to airline billing transactions. In particular the invention relates to the delivery of high number of asynchronous messages (typically >8,000 messages per seconds) containing for instance billing information over an unreliable network to a plurality of log servers, where log files containing the billing information for a known interval are created and processing of billing information for the interval is performed on the log file with the lowest loss of billing data.

BACKGROUND

In the known art it is sometimes necessary to transmit data across unreliable networks or using asynchronous transmission protocols such as User Datagram Protocol (UDP) as the throughput of such sessionless based network transactions is higher than for example, a transaction based on Transmission Control Protocol (TCP).

Figure 1:
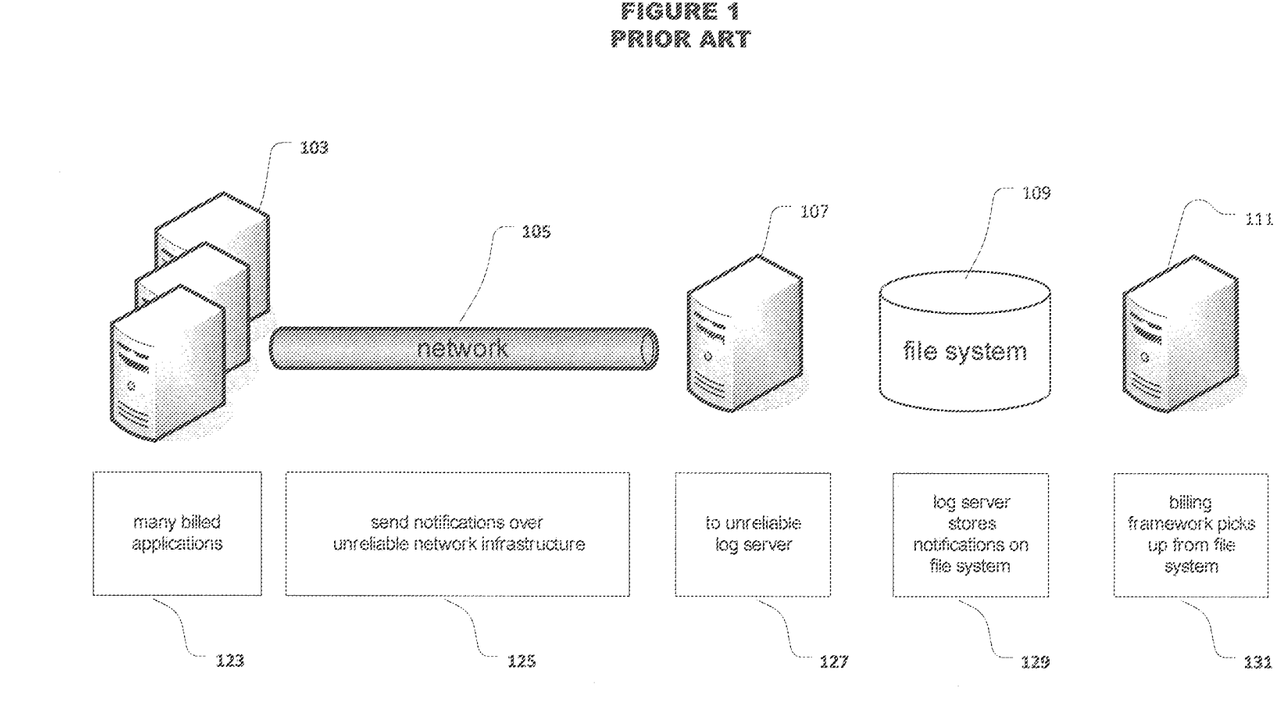
FIG. 1 is a system diagram of a prior art system.

Consider FIG. 1, an example of a prior art system. Such a system based on servers 103 can execute plurality of applications 123 which transmit billing information. Because of the necessity of performing a number of billing transactions which exceeds the capacity of network 105 using synchronous transactions; or because of the corresponding loss of throughput as the application waits for an acknowledgement of the receipt of a transaction, an asynchronous message 125 is sent over network 105. The asynchronous message is or is not received by a log server 127.

However, log server 127 is not a fault tolerant or high availability server and is therefore considered unreliable 127. All messages which are received are stored 129 in a file system 109 for processing by billing server 111 using billing system 131.

It is understood that because of messaging protocol 125 used and unreliability 127 of log server 107 transactions may be lost.

Thus, it is an object of the present invention to significantly improve the reliability of the delivery of messages while increasing or at least maintaining the throughput and while using non reliable networks.

SUMMARY OF THE INVENTION

According to an aspect, the invention relates to a computer-implemented method of providing high reliability and high performance application message delivery. The method comprises the following steps performed with at least one data processor:

at a plurality of log servers coupled to at least an application server, each application server being associated to an application: receiving asynchronously, from the at least one application server, application messages containing application information for an application transaction, each application message being received by at least some log servers among the plurality of log servers; receiving asynchronously, from the at least one application server, control messages at a predetermined interval, each control message being received by at least some log servers among the plurality of log servers;

at each of the plurality of log servers: storing the received application messages in a current application data file; storing the received control messages in a control file and upon receiving an open-close control message, closing the current application data file, storing said closed application data file and creating a new application data file as the current application data file;

comparing the control files of the plurality of log servers for a given interval; and based on this comparison, determining from among a plurality of application data files from each of the log servers, an application data file as a best-candidate for a given interval and forwarding the best-candidate file for post-processing.

Thus, in case some of the application messages forwarded by the application servers are not received at some of the log servers, the invention allows determining the application data file that is the most reliable and discarding thereby the other application data files without requiring comparing the application data files.

Optionally, the invention may comprise any one of the following facultative features:

In one embodiment, each log server is coupled to a plurality of application servers associated each to at least an application.

Advantageously, the control message comprises a number of application messages transmitted by the application server. Advantageously, the control message comprises an identifier that uniquely identifies the order of the control messages in a sequence of control messages. Preferably, the identifier is a control message number. Advantageously, the control message comprises at least one of: an identifier of an application and a timestamp of the application server. Preferably, each control message comprises an identifier of an application and a timestamp of the application server.

Preferably, the interval for forwarding a control message is a given time period.

Advantageously, the open/close control message is a Nth control message in a sequence of control messages. In one embodiment, N is predetermined. In one embodiment, the Nth control message is the fifth control message in the sequence of control messages and the given time period is a two minute time period.

Advantageously, the best-candidate file is chosen from a set of application data files for a given interval from the plurality of log servers and that have the same start and stop points. Preferably, the start and stop points are determined by the reception of open/close control messages.

According to an advantageous embodiment, the best-candidate file is chosen from among the chosen set of files, the file with the lowest application message loss rate. According to an advantageous embodiment, in case some application data files have the same number of application messages, then the best-candidate file is chosen from among the application data files with the lowest application message loss rate, the file with the lowest control message loss rate.

In one embodiment, the best-candidate file having lost application messages and not having lost more than x percent of application messages for the interval is augmented by the lost application messages existing in other files of the set of files, x being predetermined. In one embodiment, x is comprised between fifteen and forty five.

Advantageously, upon determining from among a plurality of application data files from each of the plurality of log servers, an application data file as a best-candidate for a given interval, the server forwards the best-candidate file for application processing.

In one embodiment, the application is a billing transaction application and the application messages relate to the billing of services and products related to the travel and tourism industry.

In one embodiment, the application is an airline billing transaction application.

According to another aspect, the invention relates to a non-transitory computer-readable medium that contains software program instructions, where execution of the software program instructions by at least one data processor results in performance of operations that comprise execution of the method of the invention.

Another aspect of the invention relates to a system for high reliability and high performance application message delivery. The system comprises:

a plurality of log servers coupled to the output of at least one application server;

each log server being configured to receive asynchronously, from the at least one application server: application messages containing application information and control messages;

each log server being also configured to: store the received application messages in a current application data file and to store the received control messages in a control file; and upon receiving an open-close control message, to close the current application data file, to store said closed application data file, to add said closed application data file to a plurality of application data files and to create a new application data file as the current application data file;

a server coupled to the plurality of log servers, said server being configured to: compare the control files of the plurality of log servers for a given interval; based on this comparison, determine from among a plurality of application data files from each of the log servers, an application data file as a best-candidate for a given interval; and forward the best-candidate file for post-processing.

Optionally, the system comprises a plurality of application servers and a plurality of applications executing on a processor of any of the plurality of application servers, each of the application servers having an output coupled to an input of each of the log servers.

According to another aspect the invention solves the issues of loss by providing high reliability and high performance billing message delivery, forwarding asynchronously a billing message containing billing information for an application transaction to each of a plurality of log servers; forwarding asynchronously control messages to each of the plurality of log servers at a predetermined interval; storing at each of the plurality of log servers received billing messages in a current billing data file; storing at each of the plurality of log servers received control messages in a control file and upon receiving a open-close control message, closing the current billing data file, adding said closed billing data file to a plurality of billing data files and creating a new billing data file as the current billing data file; and determining from among a plurality of billing data files from each of the log servers, a billing data file as a best-candidate for a given interval and forwarding the best-candidate file for billing processing.

In accordance with a still further aspect of this invention there is disclosed a system for high reliability and high performance application message delivery, characterized in that it comprises:

at least one application executing at least part of an application transaction on one application server, a plurality of log servers coupled to the output of the at least one application server;

the least one application server being configured to forward asynchronously to each of the plurality of log servers: application messages containing information for a transaction and control messages;

each log server being configured to: store the received application messages in a current application data file and to store the received control messages in a control file; and upon receiving an open-close control message, to close the current application data file, to store said closed application data file and to create a new application data file as the current application data file;

a server coupled to the plurality of log servers, said server being configured to: compare the control files of the plurality of log servers for a given interval; based on this comparison, determine from among a plurality of application data files from each of the log servers, an application data file as a best-candidate for a given interval; and forward the best-candidate file for post-processing.

Optionally, the application is a billing application executing at least part of a billing transaction. Preferably, the application message is a billing message containing data related to billing. Preferably, the application data file is a billing data file.

Another aspect of the invention relates to a computer program product comprising instructions capable of performing the steps of the method according to the invention.

DETAILED DESCRIPTION OF THE INVENTION

It is recalled that the present invention takes care of the delivery of the notification messages sent by applications by using a cluster of log servers. Each application notifies all the redundant log servers at once. Each log server splits this stream of notification messages into separate, manageable files. The system determines continuously the most reliable files in the cluster and transfers that file to the recipient.

Optionally the invention may comprise any one of the following advantageous but nevertheless facultative features.

In one embodiment, each log server is coupled to a plurality of application servers associated each to at least an application (for instance a billing application).

Advantageously, the control message comprises a number of application messages (for instance billing messages) transmitted by the application server. Advantageously, the control message comprises an identifier that uniquely identifies the order of the control messages in a sequence of control messages. Preferably, the identifier is a control message number. Advantageously, the control message comprises at least one of: an identifier of an application and a timestamp of the application server. Preferably, each control message comprises an identifier of an application and a timestamp of the application server.

Preferably, each application has a defined interval for forwarding a control message in a given time period and an open/close control message is every Nth control message in the sequence of control messages. Preferably, the interval for forwarding a control message is a given time period. In one advantageous embodiment, the open/close control message is a Nth control message in a sequence of control messages. In one embodiment, N is predetermined. In one embodiment, the Nth control message is the fifth control message in the sequence of control messages and the given time period is a two minute time period.

Advantageously, the best-candidate file is chosen from a set of application data files for a given interval from the plurality of log servers and that have the same start and stop points. Preferably, the start and stop points are determined by the reception of open/close control messages.

According to an advantageous embodiment, the best-candidate file is chosen from among the chosen set of files, the file with the lowest application message loss rate. According to an advantageous embodiment, in case some application data files have the same number of application messages, then the best-candidate file is chosen from among the application data files with the lowest application message loss rate, the file with the lowest control message loss rate.

In one embodiment, the best-candidate file having lost application messages and not having lost more than x percent of application messages for the interval is augmented by the lost application messages existing in other files of the set of files, x being predetermined. In one embodiment, x is comprised between fifteen and forty five.

Advantageously, upon determining from among a plurality of application data files from each of the plurality of log servers, an application data file as a best-candidate for a given interval, the server forwards the best-candidate file for application processing.

In one embodiment, the application is a billing transaction application and the application messages relate to the billing of services and products related to the travel and tourism industry. In one embodiment, the application is an airline billing transaction application.

Figure 2:
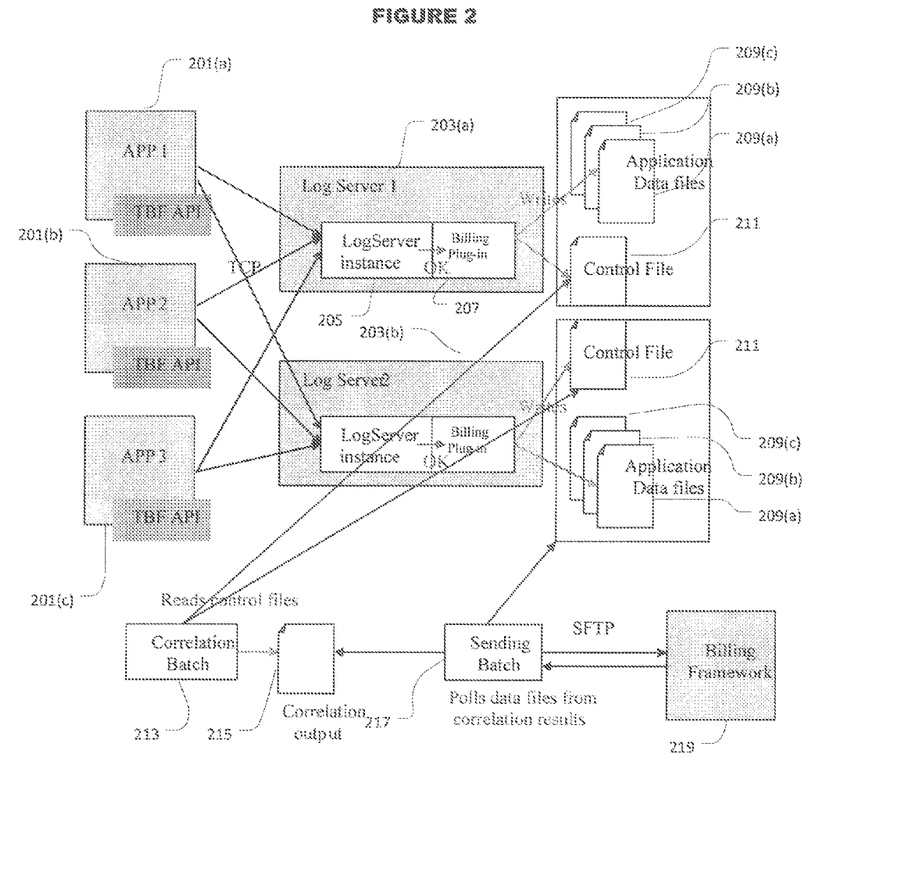
FIG. 2 is a system diagram of the architecture of the present invention.

FIG. 2 illustrates a system implementing the preferred embodiment of the invention. The system has a plurality of applications 201(a)-(c). These applications may be a plurality of different applications 201(a)-(c) running on a single server; a single application 201(a) running on a plurality of servers 103; or combination of multiple applications 201(a)-201(c) running on multiple different servers. Each of applications 201(a)-(c), forwards asynchronous application messages to log servers 203(a)-(b). An application message contains information related to the application. For instance, the application message may comprise data related to any one of: billing, customer profile, customer profile etc. It will be understood that while two log servers 203(a)-(b) are illustrated, the number of log servers is preferably more than 2. While Applications have focused on airline billing transaction data, other types of applications could forward other data in the system of the invention.

Each of log servers 203(a)-(b) has log server instance 205 and billing plug-in 207 which write received application data messages into a current application data file 209(a) and control messages to control file 211. Thus the same application message is sent from an application server 201 (a)-(c) to all the log servers 203(a)-(b). Possibly all the log servers 201 (a)-(c) receive the same application message. However in practical, at least some of the application messages may not be received by all the log servers 201 (a)-(c).

Control messages are sent at intervals described later in this document, which cause current application data file 209(a) to be closed, creating a plurality of application data files 209(b)-(c) each representative of billing application messages of a given interval.

The purpose of the control messages is two-fold. First, these messages are used to (re)synchronize the splitting of the application message stream into files 209(a)-(c). It is crucial that each log server splits the stream at the same points in the stream in order to create the synchronized files. Second, each control message will be used by the correlation algorithm to select the best-candidate amongst the synchronized files. Therefore, a summary of the control messages is stored in a control file 211.

A billing section comprising a correlation batch 213, correlation output 215 and sending batch 217 are responsible for determining the best-candidate of application data files 209 (a)-(c) and forwarding the best-candidate to the billing framework 219.

Figure 3:
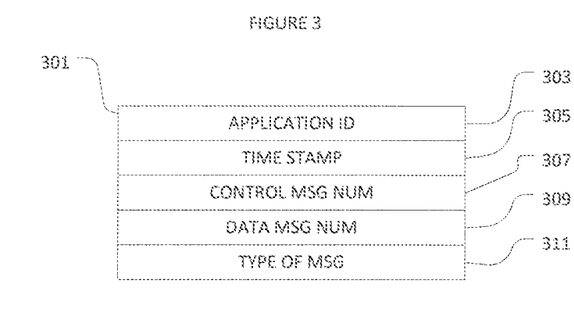
FIG. 3 is an illustration of the control message data structure.

FIG. 3 illustrates the structure of a control message as transmitted and stored in control file 211. The same control message is sent from an application server 201 (a)-(c) to all the log servers 203(a)-(b). Possibly all the log servers 201 (a)-(c) receive the same control message. However in practical, at least some of the control messages may not be received by all the log servers 201 (a)-(c).

Each control message sent by an application 201(a)-(c) comprises preferably at least four elements.

The control message comprises an application identifier 303 that identifies the application server that is the originator of the control message. Each application 201(a)-(c) has application identifier 303, which uniquely identifies the application. This element allows different billed applications to send data and control messages to the same cluster (i.e. log servers 203(a)-(b)). The cluster can easily separate the messages per source.

Timestamp 305 defines a single reference of time in the sending application server. All the synchronization steps will be based on timestamp 305 of the sending application server. This avoids the clock discrepancies usually found in a cluster of servers 203(a)-(b). This feature is all the most advantageous as the number of application servers 201(a), 201(b), 201(c) is high.

Control message number 307 indicates the unique sequential identifier for the current control message. This number allows the log server to know whether the previous control message has been lost. For instance, if two control messages successively received at a log server present control message number 307 that differs by more than one increment, then it means that at least one control message has not been received by said log server.

Application message number 309 indicates the number of application messages sent by the application 201(a)-(c). As each log server knows how many application messages it has actually received, therefore, each log server knows how many application messages were lost based upon this value.

Type of message 311 indicates the type of control message being forwarded.

Figure 4:
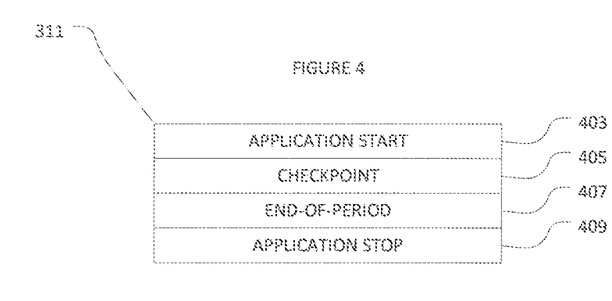
FIG. 4 is a list of the types of control messages transmitted.

FIG. 4 illustrates the type of control messages that are forwarded from applications 201(a)-(c) to log servers 203(a)-

(*c*). Application-Start 403 indicates that an Application has started and therefore a new application data file should be created. The corollary to such a control message is Application-Stop 409 which closes current application data file 209 (*a*) when the application shuts down.

Timer Interval 405 sends a message every X periods, where X is for instance and preferably 2 minutes. Every Nth, for instance N=5 (five) checkpoint sent by applications 201(*a*)-(*c*), called a splitting checkpoint, is used by log servers 203 (*a*)-(*b*) to split the stream: the log server closes the current application data file 209(*a*) and creates a new file where it will store the next set of sequential application messages. Such a splitting creates a stop point in one application data file and a start point in the new application data file. Thus, a current application data file is closed when the Nth checkpoint control message is received and a new application data file, that becomes the current application data file, is then created.

Each start point and stop point is associated to a control message number 307 which allows identifying the order of transmission. Therefore, it is easy to identify the application data files having the same start points. It is also easy to identify the application data files having the same stop points. The comparison of the application data files of various log servers as well as the splitting of the stream can therefore be easily achieved.

Since checkpoints can also be lost, log servers 203(*a*)-(*b*) uses the control message number 307 of the control message to detect such a loss. However, the control message number also informs the log server if a splitting point has been missed. [control message number modulo N=0] Other values than five could be used depending on the requirements of the system.

Where a non-splitting checkpoint is lost, the log servers 203(*a*)-(*b*) will simply write that lost event to control file 211. Any lost event in control file 211 will decrease the reliability of the appropriate application data file.

In the event that a splitting checkpoint is lost, the log servers 203(*a*)-(*b*) will close the current application data file 209(*a*) and open a new one (as if a splitting checkpoint was received). However, the current application data file and the new application data file will be out of synchronization, since they have not been closed/opened at a splitting checkpoint. The control file 211 is accordingly updated: a lost event for the missing checkpoint, the events of creating the new file, together with the timestamp. There is no event for closing the application data file. This will inform the correlation algorithm that a splitting checkpoint was lost.

END-OF-PERIOD 407 control message is sent by applications 201(*a*)-(*c*) at a time determined by the application. Typically this control message is sent at midnight for billing applications in order to separate two working days. Basically, this message forces a complete resynchronization between the billed application and the log server. All internal counters are set to zero and a new application data file and a new control file is started. It is also understood that END-OF-PERIOD could be some other period as multiple days, a week, month or year.

Since every control message contains the current timestamp of the billed application, it is now trivial to find out if an END-OF-PERIOD control message has been lost: the date in the timestamp element sent by the billed application is no longer the same as the last received date on the log server. In this case, the log server simulates the reception of END-OF-PERIOD messages 407, sets all internal counters to zero and starts a new application data file. Control file 211 is updated as if a splitting checkpoint has been missed.

The types of control messages 403-409 as stored in control files 211 allow for splitting the stream of application messages into synchronized application data files 209(*a*)-209(*c*). If no control messages are lost, all files will be synchronized. When control messages are lost, a number of files in the cluster will be out-of-synchronization: some file(s) will be closed/opened at a different timestamp. In addition to the knowledge that files are synchronized, the system is also informed about the correctness of each file. Both facts about the application data files will be exploited by a correlation algorithm.

A billing server 219 as implemented in the system of the present invention must receive by determining the best-candidate of log files 209(*a*)-(*c*) on each of log servers 203(*a*)-(*b*). The decision of the best-candidate is done by the correlation batch 213.

The best-candidate selection is based on comparing the control file 211 of each log server 203(*a*)-(*b*). By not comparing the numerous and large application data files 209(*a*)-(*c*), this step is executed in real time.

The system aligns the open file/close file events in different control files 211 of each log server 203(*a*)-(*b*). The alignment is based on the timestamp of the events. A quorum of $\lceil (n+1)/2 \rceil$ is needed to agree on an alignment. The alignment simply indicates the files for which the stream has been split on identical points in time. In this nominal case, the system determines the best-candidate amongst the synchronized application data files 209(*a*)-(*c*) by selecting the application data file that contains firstly the most messages and secondly the least lost checkpoint messages.

If no quorum is reached, the system will prefer the files for which both an open file event and a close file event is found. In case of a lost splitting checkpoint, there is no close event registered in the control file 211. It means that the system will lower the quorum, but will still only consider the files that received both the open file and close file events. The system defines the best-candidate based on firstly the number of application messages and secondly the number of lost checkpoint messages.

In the extreme case where not a single file has a close file event, (this means the splitting checkpoint was missed by all log servers), the system will prefer the files firstly with the least lost checkpoint messages and secondly the most messages.

It is important that the next open file events to consider must chronologically follow the close event of the currently selected best-candidate in order to avoid sending duplicate messages to the billing server 219

The system also improves the quality of the selected best-candidate by retrieving a part of missing messages in other synchronized files. The improvement is only done for synchronized files where the best-candidate has lost less than x % of the messages (i.e. the number of received messages is greater than (100−x) %). Advantageously, $15<x<45$ and more advantageously x=30, i.e. the number of received messages is greater than 70%. If even the best-candidate file has lost more than x % messages, it is considered that the other application data file cannot provide the missing messages.

In the case of an eventual improvement, each checkpoint of the synchronized files is compared. Since each checkpoint contains the number of lost messages for the last 'm' minutes (for instance m=two (2)), the system can identify which of the files has the best data block. If another than the best-candidate contains more messages for the 'm' minute span, the block of messages is extracted and replaced in the best-candidate file.

This method allows improvement of the best-candidate in a real-time matter, since only the events in the summary control files 211 are used to identify the best-blocks in application data files 209(*a*)-(*c*).

Figure 5:
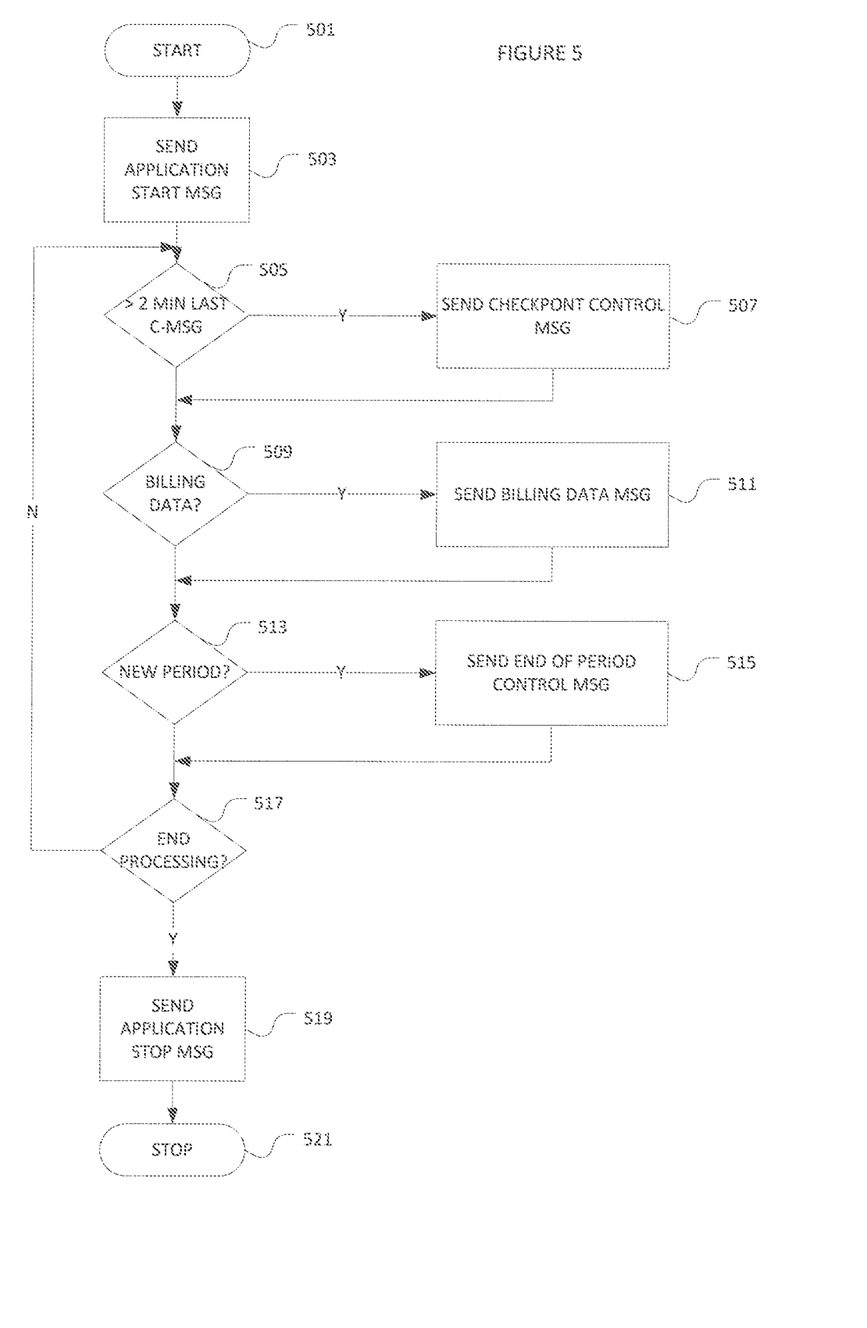
FIG. 5 is a flow chart of processing performed by an application sending billing messages.

FIG. 5 illustrates an example of the steps taken by a thread of an application 201(a)-(c) implementing the invention. In step 501, a process begins and immediately sends in step 503 an Application-Start control message 403 to log servers 203(a)-(c).

The application billing thread then iterates looking for work. In step 505, it is determined if more than the predetermined time period, typically 2 minutes, has elapsed since the last control message has occurred, if the answer is yes, then Checkpoint control message 405 will be sent to log servers 203(a)-(c) in step 507. If the answer is no, proceed to step 509 and determine if an application message (for instance a billing application message) needs to be sent. If the answer is yes, in step 511 send application message with the data to log servers 203(a)-(c).

If the answer is no, proceed to step 513, where it is determined if it is a new day, or other billing period. If the answer is yes, in step 515 send an END-OF-PERIOD control message 407 to log servers 203(a)-(c).

If the answer is no, proceed to step 517, where it is determined if the application program is shutting down. If the answer is yes, send an Application-Stop control message 409 in step 519 and then end processing in step 521, otherwise continue to iterate.

Figure 6:
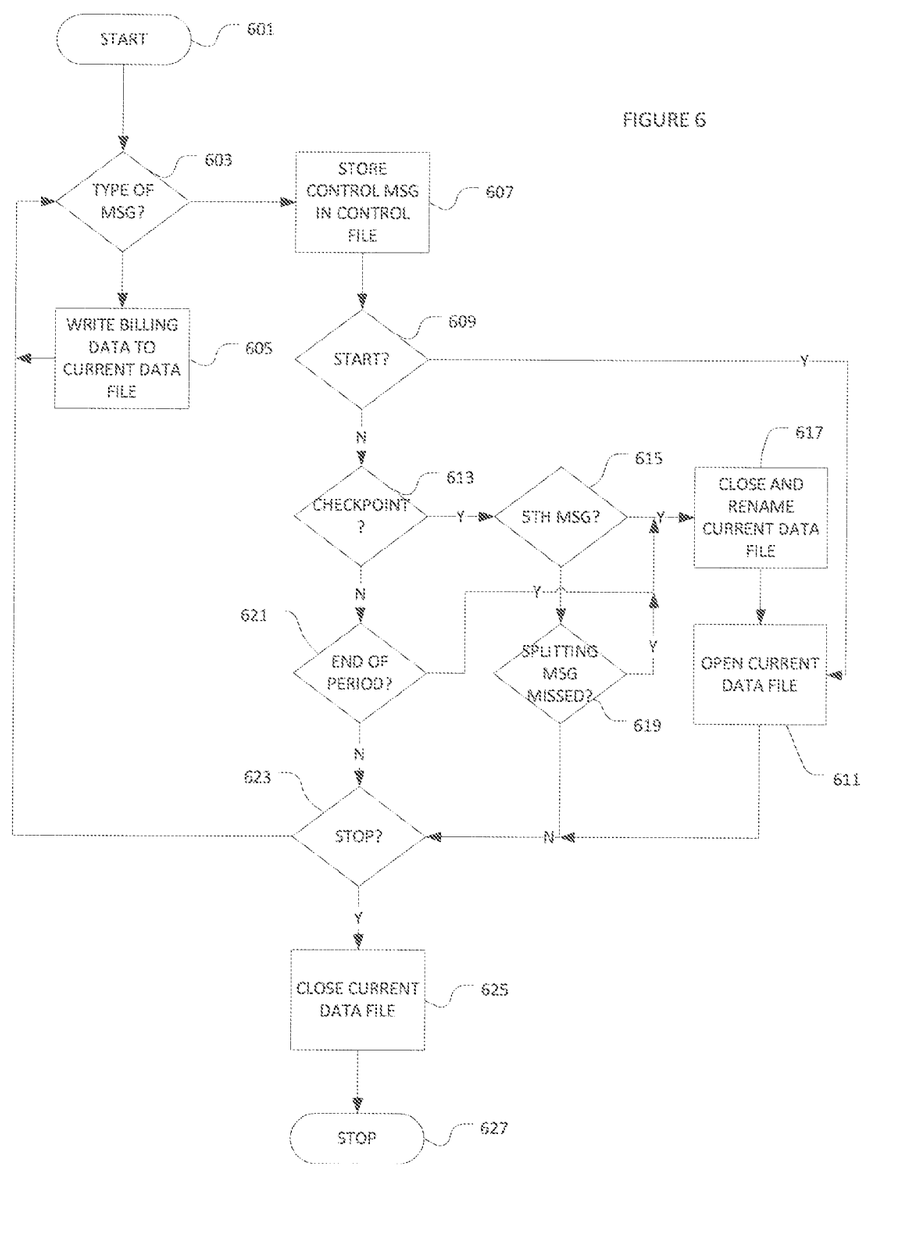
FIG. 6 is a flow chart of processing performed by a log server receiving messages.

FIG. 6 illustrates an example of the steps of a program receiving log messages on log servers 203(a)-(b). Processing begins a step 601. In step 603 it is determined if the message is an application message (for instance a billing application message), if yes, store the application message in current log file 209(a) in step 605. If no, store the control message 301 in the control file in step 607, then determine what type of control message 301 has been received. In step 609, determine if control message 301 is an Application-Start control message 403, if yes, then at step 611 open a new current application data file 209(a). If no, proceed to the next step 613, where it is determined if the control message 301 is a Checkpoint control message 405, if yes determine if this is the $N^{th}$ (N being predetermined and being for instance five (5)) checkpoint message 405 by checking the control message number 307 at step 615. If yes, at step 617 close current application data file 209(a), now becoming the next application data file in the sequence 209(b, c, ...). Open a new file as current application data file 209(a).

If no, step 619 determines if any prior control messages were missed and if such a message was missed, then perform step 617.

In step 621, determine if control message 301 is an END-OF-PERIOD control message 403, if yes, then perform step 617. If no, in step 623 determine if control message 301 is an Application-Stop. If yes, then close current application data file 209(a) now becoming the next application data file in the sequence 209(b, c, ...) in step 625. End processing in step 627.

Figure 7:
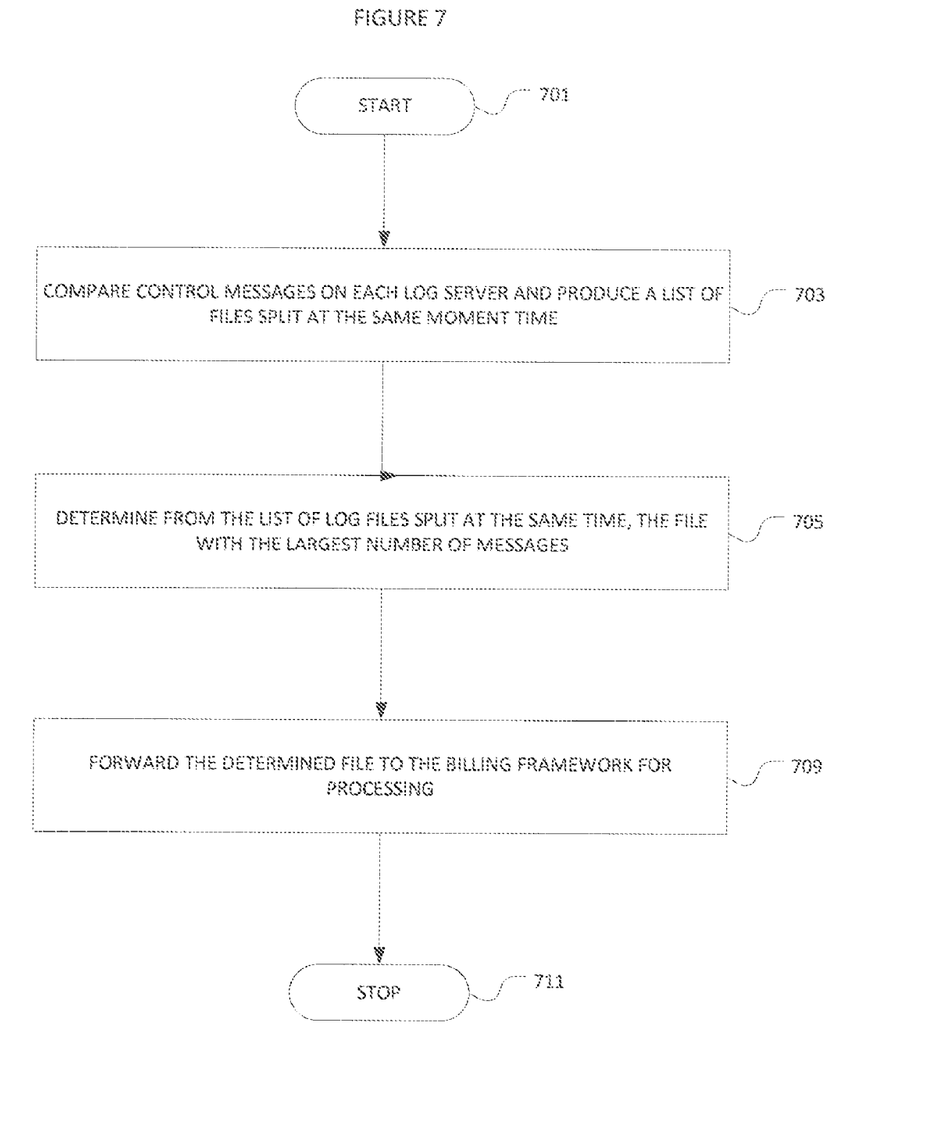
FIG. 7 is a flow chart of processing of a best-candidate log file.

FIG. 7 illustrates an example of a method according to the invention for determining the best-candidate selection for log files 209(a)-(c) from each of log servers 203(a)-(b). Starting from step 701, at step 703 determine application data files 209(a)-(c) that have been split at the same points in time by comparing control messages 301 in each of log servers 203(a)-(b). From the list of application data files 209(a)-(c) that have been split at the same points in time on each of log servers 203(a)-(b), determine 705 the log file that has the largest number of received application messages. Preferably, in case at least two application data files 209(a)-(c) comprise the same number of application messages, then the system compares the number of lost control messages. The best-candidates among the application data files 209(a)-(c) that have been split at the same points in time on each of log servers 203(a)-(b) is the application data files 209(a)-(c) that has the highest number of application messages and that has the highest number of control messages.

Forward 709 the chosen application data file to the billing framework for processing and end processing 711.

Figure 8:
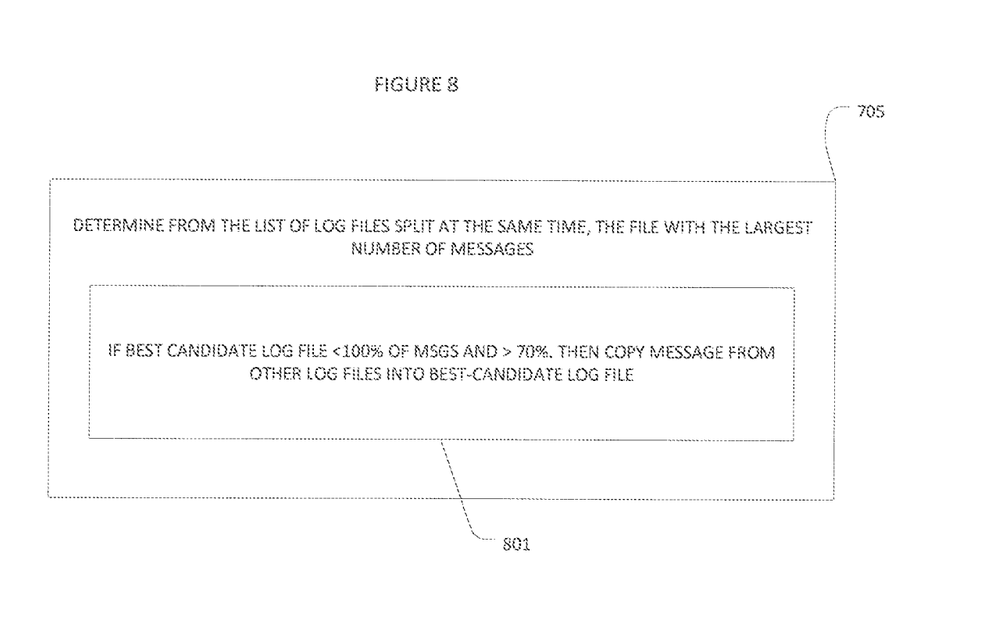
FIG. 8 is a flowchart of improving the quality of a chosen best-candidate file.

FIG. 8 illustrates a method of combining files to increase quality. If in step 705 it is determined 801 that application data files are synchronized and the best-candidate has more than 70% of its billing application messages but less than 100% of the messages, supplement any missing application messages from the application data files for the same interval of the other log servers into the best-candidate log file.

Figure 9:
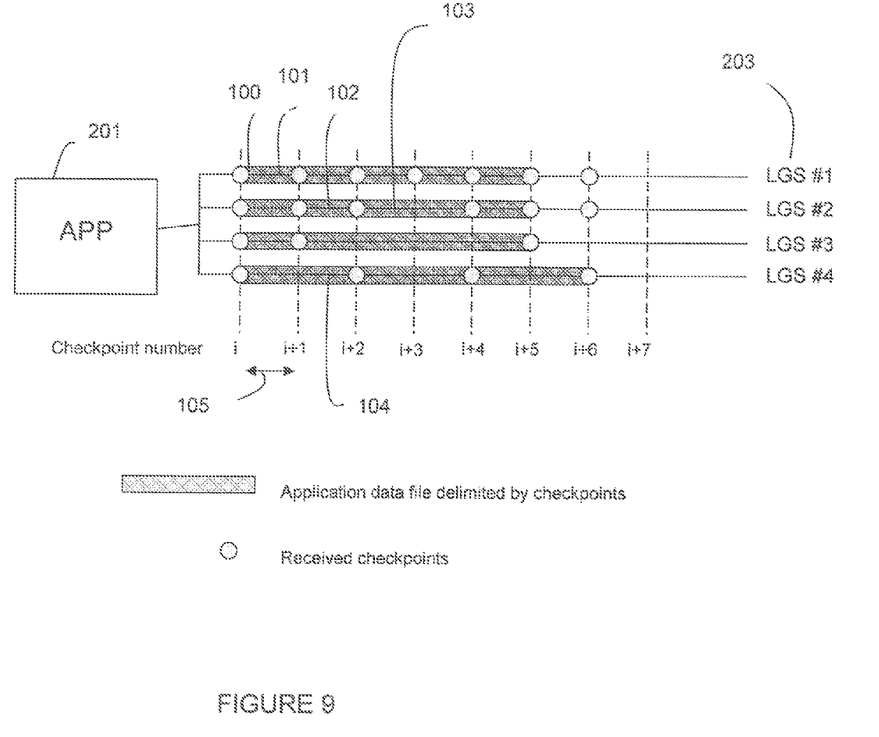
FIG. 9 is simplified illustration of an exemplary embodiment where messages are transmitted from an application server to a cluster of four log servers.

FIG. 9 illustrates an exemplary embodiment where an application 201 sends messages to a cluster of four log servers 203 referred to as LGS #1, LGS #2, LGS #3 and LGS #4.

The first synchronized checkpoint 100 (checkpoint i) triggers at each of the four log servers 203 the start of an application data file. Thus, the application data file of the four log servers 203 have the same start point. Application messages are also sent to the log servers 203. Each log server 203 receives these application messages and stores them in the application data file that has just been opened. Thus, application messages are stored in application data files 101, 102, 103, 104 by respectively the log servers LGS #1, LGS #2, LGS #3 and LGS #4.

Every time interval 105, a new control message is sent by the application server 201.

Some log servers may not receive a normal checkpoint. For example LGS #2 missed checkpoint having the number i+3, LGS #3 missed checkpoint number i+2, checkpoint number i+3, checkpoint number i+4 and LGS #4 missed checkpoint number i+1 and checkpoint number i+3. Some log servers may also miss synchronization checkpoint. For instance LGS #4 missed checkpoint having the number i+5, said checkpoint being a synchronization checkpoint. This checkpoint is an open/close control message, which triggers the closing of the current application data file and the opening of a new application data file. Therefore, at log servers LGS #1, LGS #2 and LGS #3 the application data files 101, 102, 103 are closed at the same time upon reception of control message i+5. However, at log servers LGS #4 the application data file 104 is closed later. Thus, application data files 101, 102, 103 have the same start and stop points and application data file 104 does not have the same stop point as the other ones.

In this embodiment, the open/close control message is the $5^{th}$ control message and the interval for forwarding a control message is depicted by the arrow 105.

The best candidate file is chosen from the set of application data files having the same start and stop points, i.e., the application data files 101, 102, 103. Among this set of application data files 101, 102, 103 the one that will be considered as the best candidate is the one comprising the highest number of application messages. This comparison of the number of application messages is based on the comparison of the control files created by each log server. Therefore, it is not necessary to compare the application data files which requires much more time and processing capacity. In case two or more application data files 101, 102, 103 have the same number of application messages, then, the best candidate is the one comprising the highest number of control messages. For instance, if application data files 102 and 103 have the same number of application messages, this number being higher than the one of application data files 101, then application data files 102 will be considered as the best candidate and application data files 101, 103 and 104 will be discarded.

Although the exemplary embodiments have been described in relation to a particularly advantageous application i.e., delivery of billing message, all features described and illustrated apply to other applications.

Figure 10:
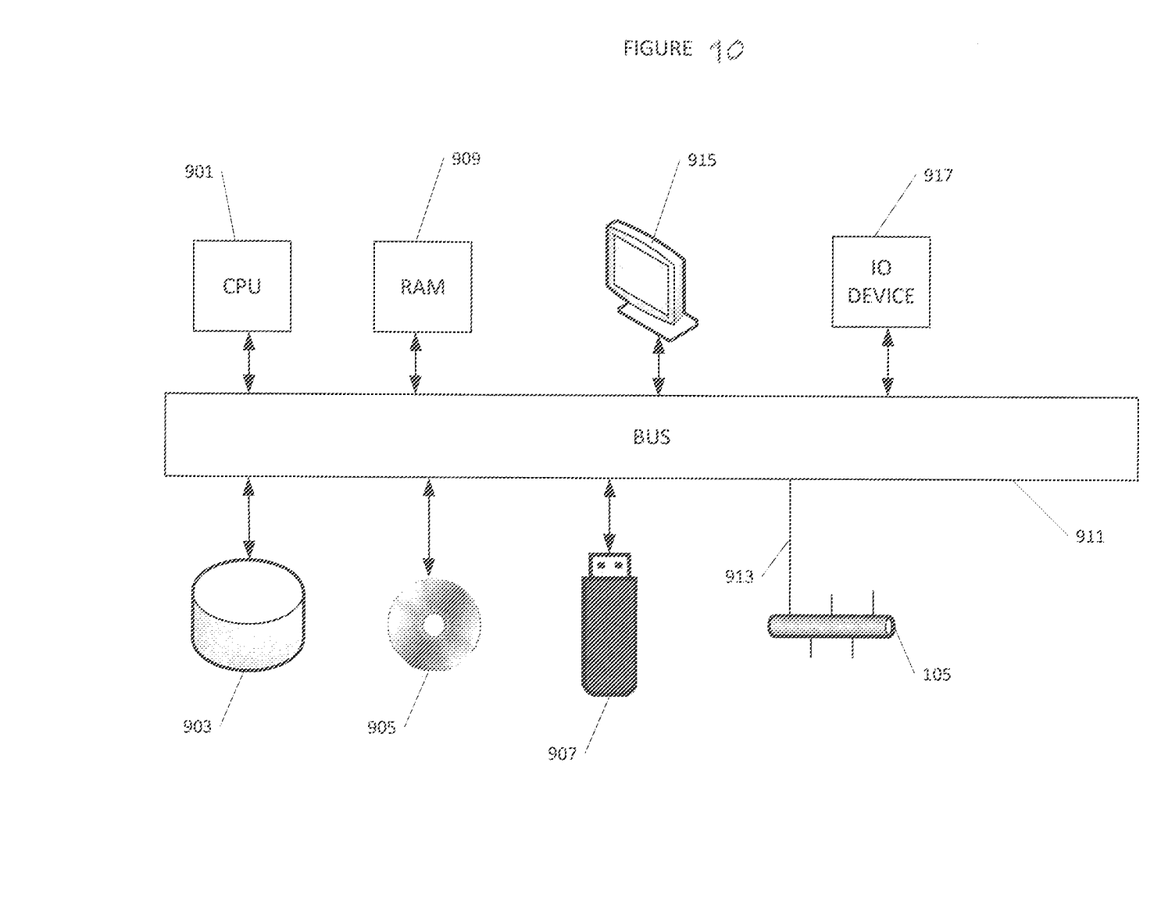
FIG. 10 is a diagram of the internal architecture of any of the servers of the system.

It is understood by those of ordinary skill that above system and method can by implemented as a computer program stored on a computer readable storage medium such as a hard drive, 903, DVD/CD-ROM 905, thumb drive 907 of FIG. 10, where the CPU 901 loads the computer program into a RAM 909 across a bus 911 and executes the program as a series of instructions accessing the devices as described above are communicating across a network adapter 913 to network 105 and using a display 915 and input output devices 917 such a keyboard and mouse, etc. As the computer program is stored on a computer readable storage medium and the verb stored means to make permanent, propagation signals are excluded from the meaning of a computer readable storage medium.

As can be appreciated, there are a number of benefits and technical effects that are realized by the use of the invention. In particular, the invention allows significantly increasing the reliability of the message through sending the same messages to various log servers and while maintaining a high throughout since the most reliable messages can be selected without requiring to process large volume of data. Typically, the invention allows sending more than 10 000 transactions per second while maintain a ratio of lost message below 0.14%.

What we claim is:

1. A method of providing application message delivery, the method comprising:
   receiving asynchronously, by at least some of a plurality of log servers, a plurality of application messages containing application information and a plurality of control messages associated with the plurality of application messages over a predetermined interval, wherein each of the plurality of control messages is received by one or more log servers among the plurality of log servers;
   storing, at each of the plurality of log servers, the received application messages in a plurality of application data files and the received control messages in a plurality of control files;
   comparing, for each of the plurality of log servers, a quantity of the plurality of application messages asynchronously received by each of the plurality of log servers and an application message number from the control messages stored in the control files at each of the plurality of log servers in order to evaluate a quantity of stored application messages in each application data file of the plurality of log servers;
   based on the comparison, specifying, by a server, one of the application data files at one of the plurality of log servers as a best-candidate file; and
   forwarding, from the server, the best-candidate file for post-processing,
   wherein each control message includes a control message number used for identifying a sequential order for the plurality of control messages and an identifier of an application server that originated the control message, and the best-candidate file includes a quantity of stored application messages that is greatest in comparison with the application data files having fewer stored application messages.

2. The method of claim 1, wherein each control message includes a timestamp.

3. The method of claim 1, wherein one of the control messages is an open/close control message that instructs at least one of the log servers that receive the open/close control message to close a current one of the application data files and open a new one of the application data files to store subsequent application messages received by at least one of the log servers.

4. The method of claim 3, wherein the open/close control message is received by at least one of the log servers after receiving a designated number of control messages that are not open/close control messages.

5. The method of claim 1, wherein each application data file is a billing transaction application and wherein each application message relates to billing of services related to a travel industry.

6. The method of claim 1, wherein each open/close message includes an open message number indicating an opening of the application data file associated with the open/close message and a close message number indicating a closing of the application data file associated with the open/close message identifying the application data file in a sequence of the application data files received by at least one of the log servers.

7. The method of claim 6, further comprising:
   comparing each open/close message associated with each application data file received by each log server to determine the best-candidate file chosen from among the plurality of application data files when at least two application data files have an equivalent quantity of application messages, wherein the best-candidate file includes both an open message and a close message.

8. The method of claim 7, further comprising:
   retrieving a portion of lost application messages for the best-candidate file from application data files not determined as the best-candidate file when the best-candidate file has lost less than a specified percent of application messages included in the plurality of application files.

9. The method of claim 6, further comprising:
   terminating, by at least one of the log servers, a current application data file when the close message is received;
   generating, by at least one of the log servers, a new application data file when the open message is received; and
   synchronizing, by at least one of the log servers, the application messages by terminating the current application data file and opening the new application data file based on the close message and the open message.

10. The method of claim 1, wherein comparing the stored control messages in each control file for the predetermined interval comprises:
    decreasing a quantity of messages that are to be compared for each application data file by selecting each control file to compare the control messages included in each control file rather than comparing the application messages included in each application data file; and
    comparing control files in real-time due to a reduction in the control messages that are compared in association with the comparison of the control files.

11. The method of claim 1, wherein the application messages are billing messages, and the application information is information for a billing transaction.

12. A system for high reliability and high performance application message delivery, the system comprising:
    a plurality of log servers each including:
    a first processor; and
    a first memory coupled with the first processor, the first memory including instructions that, when executed by the first processor, cause the first processor to:
      receive asynchronously, by at least some of the plurality of log servers, a plurality of application messages containing application information and a plurality of control messages associated with the plurality of application messages over a predetermined interval, wherein each of the plurality of control messages is received by one or more log servers among the plurality of log servers; and store, at each of the plurality of log servers, the received application messages in a plurality of application data files and the received control messages in a plurality of control files; and a server coupled to the plurality of log servers, the server including:

a second processor; and a second memory coupled with the second processor, the second memory including instructions that when executed by the second processor, cause the second processor to:

compare, for each of the plurality of log servers, a quantity of the application messages asynchronously received by each of the plurality of log servers and an application message number from the control messages stored in the control files at each of the plurality of log servers in order to evaluate a quantity of application messages stored in each application data file of the plurality of log servers;

based on the comparison, specify one of the application data files at one of the plurality of log servers as a best-candidate file; and forward the best-candidate file for post-processing, wherein each control message includes a control message number used for identifying a sequential order for the plurality of control messages and an identifier of an application server that originated the control message, and the best-candidate file includes a quantity of stored application messages that is greatest in comparison with to the application data files having fewer stored application messages.

13. The system of claim 12, wherein each control message includes a timestamp.

14. The system of claim 13, wherein the instructions, when executed by the processor, further cause the processor to:

compare each control message number associated with each control message to determine the best-candidate file chosen from the plurality of application data files, wherein the best-candidate file includes a greatest quantity of control messages with the control message numbers received in sequence.

15. The system of claim 13, wherein an open/close message is a control message that instructs at least one of the log servers that receive the open/close message to close the current application data file and open a new application data file to store subsequent application messages received by at least one of the log servers.

16. The system of claim 15, wherein each open/close message includes an open message number indicating an opening of the application data file associated with the open/close message and a close message number indicating a closing of the application data file associated with the open/close message identifying the application data file in a sequence of the application data files received by at least one of the log servers.

17. The system of claim 16, wherein the instructions, when executed by the processor, further cause the processor to:

compare the open/close message associated with each application data file received by at least one of the log servers to determine the best-candidate file when at least two of the application data files have an equivalent quantity of application messages, and the best-candidate file includes both an open message and a close message.

18. The system of claim 17, wherein the instructions, when executed by the processor, further cause the processor to:

retrieve a portion of lost application messages for the best-candidate file from application data files not determined as the best-candidate file when the best-candidate file has lost less than a specified percent of application messages included in the plurality of application files.

19. The system of claim 16, wherein the instructions, when executed by the first processor, cause the first processor to:

terminate a current application data file when the close message is received;

generate a new application data file when the open message is received; and synchronize each application message by terminating the current application data file and opening a new application data file based on the close message and the open message received by at least one of the log servers.

20. The system of claim 12, wherein the instructions, when executed by the second processor, further cause the second processor to:

decrease a quantity of messages that are to be compared for each application data file by selecting each control file to compare the control messages included in each control file rather than comparing the application messages included in each application data file; and compare control files in real-time due to a reduction in messages that are compared associated with a comparison of control files.

21. A system for high reliability and high performance billing message delivery, the system comprising:

a plurality of log servers each including:

a first processor; and a first memory coupled with the first processor, the first memory including instructions that, when executed by the first processor, cause the first processor to:

receive asynchronously, by at least some of the plurality of log servers, a plurality of billing messages each containing information for a billing transaction and a plurality of control messages associated with the plurality of billing messages over a predetermined interval; and store, at each of the plurality of log servers, the received billing messages in a plurality of billing data files and the received control messages in a plurality of control files, and a server coupled to the plurality of log servers the server including:

a second processor; and a second memory coupled with the second processor, the second memory including instructions that, when executed by the second processor, cause the second processor to:

compare, for each of the plurality of log servers, a quantity of the plurality of billing messages and an application message number from the control messages stored in the control files at each of the plurality of log servers to evaluate a quantity of billing messages stored in each billing data file;

based on the comparison, specify, by the server, one of the billing data files as a best-candidate file; and forward, from the server, the best-candidate file for post-processing, wherein each control message includes a control message number used for identifying a sequential order for the plurality of control messages and an identifier of an application server that originated the control message, and the best-candidate file includes the quantity of stored application messages that is greatest in comparison with the application data files having fewer stored application messages.

* * * * *

UNITED STATES PATENT AND TRADEMARK OFFICE
CERTIFICATE OF CORRECTION

PATENT NO.         : 8,898,223 B2
APPLICATION NO.    : 13/418819
DATED              : November 25, 2014
INVENTOR(S)        : Paul De Schacht et al.

It is certified that error appears in the above-identified patent and that said Letters Patent is hereby corrected as shown below:

In the Claims

At column 13, claim number 12, line number 31, after "with" delete "to"

At column 14, claim number 21, line number 41, after "servers" insert --,--

Signed and Sealed this
Nineteenth Day of May, 2015

Michelle K. Lee
*Director of the United States Patent and Trademark Office*